United States Patent
Sigal et al.

(10) Patent No.: US 12,266,021 B2
(45) Date of Patent: Apr. 1, 2025

(54) EXPENSE-TYPE AUDIT MACHINE LEARNING MODELING SYSTEM

(71) Applicant: SAP SE, Walldorf (DE)

(72) Inventors: Lev Sigal, Carmiel (IL); Anna Fishbein, Hadera (IL); Anton Ioffe, Netanya (IL)

(73) Assignee: SAP SE, Walldorf (DE)

( * ) Notice: Subject to any disclaimer, the term of this patent is extended or adjusted under 35 U.S.C. 154(b) by 328 days.

(21) Appl. No.: 17/732,730

(22) Filed: Apr. 29, 2022

(65) Prior Publication Data

US 2023/0351523 A1    Nov. 2, 2023

(51) Int. Cl.
*G06Q 40/12* (2023.01)
*G06N 3/048* (2023.01)
*G06N 3/10* (2006.01)

(52) U.S. Cl.
CPC ............. *G06Q 40/12* (2013.12); *G06N 3/048* (2023.01); *G06N 3/10* (2013.01)

(58) Field of Classification Search
CPC .................................................... G06Q 40/12
See application file for complete search history.

(56) References Cited

U.S. PATENT DOCUMENTS

| | | | |
|---|---|---|---|
| 2012/0185368 A1* | 7/2012 | Schloter | G06Q 40/00 705/30 |
| 2016/0078566 A1* | 3/2016 | Farrell | G06Q 10/10 705/30 |
| 2019/0065939 A1* | 2/2019 | Bourgoin | G06N 3/08 |
| 2020/0074359 A1* | 3/2020 | Subramanian | G06F 16/387 |
| 2022/0043788 A1 | 2/2022 | Bittmann et al. | |

OTHER PUBLICATIONS (Erdmann, "Introduction to Deep Learning", 2020, https://indico.scc.kit.edu/event/669/contributions/6534/attachments/3172/4612/BasicDeepLearningTutorial2020.pdf, (Year: 2020).*

* cited by examiner

*Primary Examiner* — Allen C Chein
(74) *Attorney, Agent, or Firm* — SCHWEGMAN LUNDBERG & WOESSNER, P.A.

(57) ABSTRACT

Systems and methods are provided for training a machine learning model to use comments entered by a user submitting an expense to determine a correct expense type. The trained machine learning model is used to predict an expense type by analyzing submitted text comments corresponding to a submitted expense. The expense can be flagged if a mismatch is determined between the expense type of the submitted expense and the predicted expense type, or the submitted expense can be automatically updated to the predicted expense type.

19 Claims, 7 Drawing Sheets

*New Expense*

| Details | Itemizations |

Expense Type *
[ Hotel | > ]

Recently Used
Dinner
Lunch
Entertainment - Clients
Individual Meals
Hotel

01. Travel Expenses

Payment Type *
[ Cash | > ]

Amount *
[ 100.00 ]

Currency *
[ US, Dollar | > ]

Receipt Status *
[ Receipt | > ]

Comment
[ 3 months membership in Fitness Center ]

[ Save Expense ]  [ Save and Add Another ]  Cancel

Cancel    Save Expense
Hide Receipt ▢

▢ Upload Receipt Image

* Required field

*New Expense*

| Details | Itemizations |

Cancel  Save Expense

Hide Receipt ☐

\* Required field

Expense Type *
Hotel

Check-in Date *
MM/DD/YYYY 📅

Check-out Date *
MM/DD/YYYY 📅

Nights: 0

Transaction Date *
MM/DD/YYYY 📅

Business Purpose *

Vendor *
Search for Vendor

City of Purchase *
🌐

Payment Type *
Cash

Currency *
US, Dollar

Amount *
100.00

Receipt Status *
Receipt

Comment
3 months membership in Fitness Center

☐ Upload Receipt Image

Save Expense   Save and Add Another   Cancel

○ Warning
The selected Expense Type doesn't match the entered text of the comment.
OK
← 502

EXPENSE-TYPE AUDIT MACHINE LEARNING MODELING SYSTEM

BACKGROUND

An important part of the audit process for many entities is making sure that the right expense type has been selected for a transaction. This is important because there is a direct mapping between expense types and the entity's general ledger for their accounting system. Generally, each entity has many custom expense types that are unique to the entity as well as standard categories that are used across different entities and thus, can have hundreds of expense types. Since it impacts the general ledger, entities need to be sure that the correct expense type has been selected for each expense submitted. There are so many expenses submitted, however, that is not possible to manually review each to be sure they are the correct expense type.

BRIEF DESCRIPTION OF THE DRAWINGS

Various ones of the appended drawings merely illustrate example embodiments of the present disclosure and should not be considered as limiting its scope.

FIG. 3 illustrates an example user interface, according to some example embodiments.

FIG. 5 illustrates an example user interface, according to some example embodiments.

DETAILED DESCRIPTION

Systems and methods described herein relate to an expense audit machine learning modeling system. As explained above, an important part of the audit process for many entities is making sure that the right expense type has been selected for a transaction. This is important because there is a direct mapping between expense types and the entity's general ledger for their accounting system. Generally, each entity has many custom expense types that are unique to the entity as well as standard categories that are used across different entities and thus, can have hundreds of expense types. Since it impacts the general ledger, entities need to be sure that the correct expense type has been selected for each expense submitted. There are so many expenses submitted, however, that is not possible to manually review each to be sure they are the correct expense type.

Some limited automated processes have been implemented to find potential errors, such as by automatically detecting that a time, location, or amount of a reported expense does not match a time, location, or amount of the associated receipt. Unfortunately, this only covers about 2-10% of all expenses submitted and thus, there are many erroneously typed expenses that are automatically approved.

Further, not all expenses submitted contain receipts. Moreover, many companies have auditing policies where expenses under a certain amount (e.g., less than $20) or submitted by a certain level of employee (e.g., senior vice president) are automatically approved, and thus, errors in expense type are also not detected for such expenses.

Embodiments described herein address these technical issues by training a machine learning model (e.g., a deep neural network model) to use comments entered by a user submitting an expense to detect a correct expense type. For example, as part of entering and submitting an expense, a user can enter any comments related to the expense, such as "monthly fitness center membership" or "lunch with MBA students for training program." These comments are entered in a free form manner thus, are unstructured in nature. The trained machine learning model is used to predict an expense type by analyzing these submitted text comments corresponding to a submitted expense. The expense can be flagged if a mismatch is determined between the expense type of the submitted expense and the predicted expense type, or the submitted expense can be automatically updated to the predicted expense type.

Figure 1:
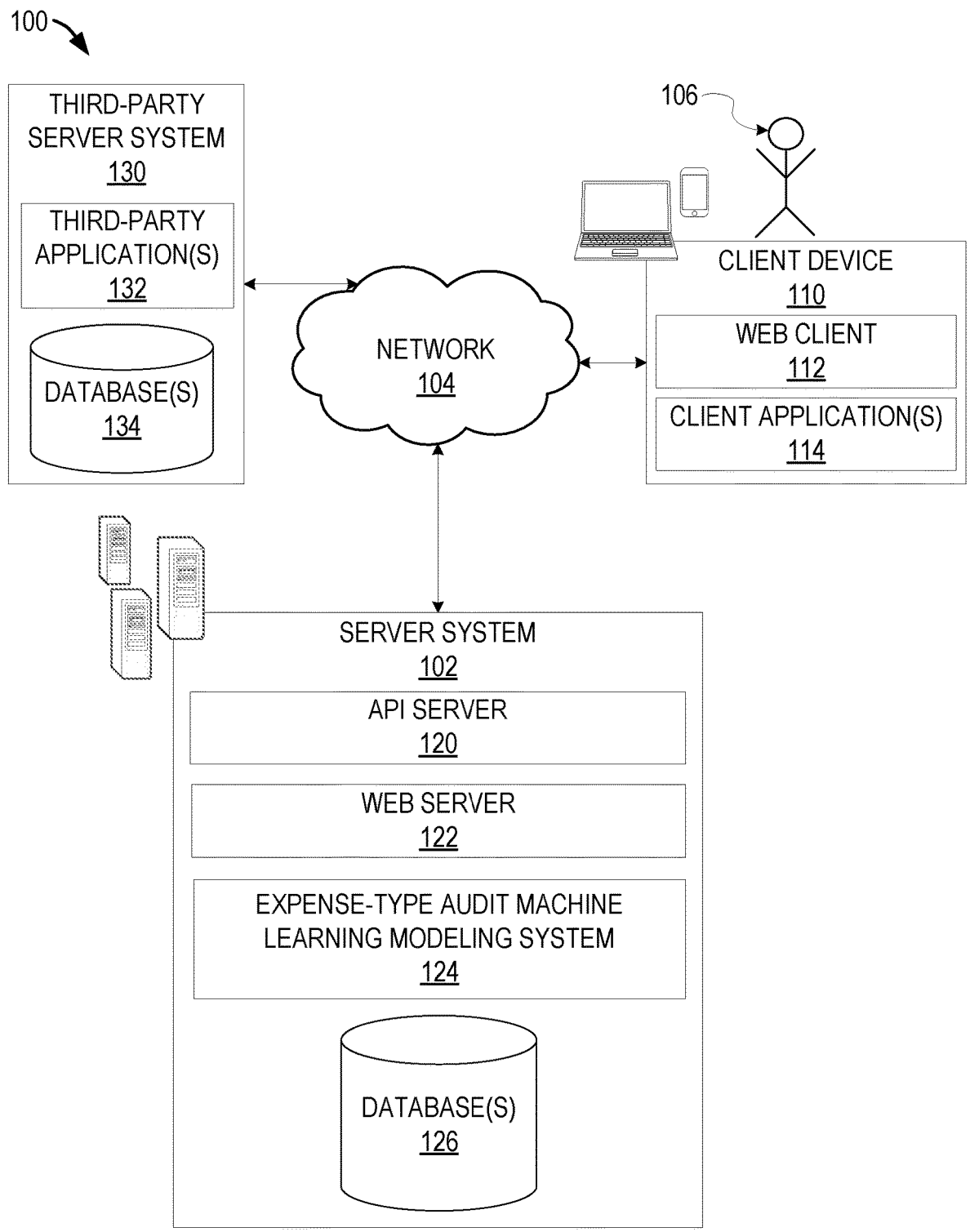
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, an expense-type audit machine learning modeling system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an expense application for entering and transmitting expenses, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access software version information, access an ERP system, access a CRM system, access machine learning models, access procurement, spend management and supply chain services, to authenticate a user 106, to verify a method of payment, access test data, access a development landscape build system, access an expense reporting system, and so forth), to access an expense-type audit machine learning modeling system 124, and so forth. Conversely, one or more client applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and an expense-type audit machine learning modeling system 124 that may be communicatively coupled with one or more databases 126.

The one or more databases 126 may be storage devices that store data related to users of the system 100, applications associated with the system 100, cloud services, machine learning models, parameters, and so forth. The one or more databases 126 may further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The expense-type audit machine learning modeling system 124 may provide back-end support for third-party applications 132 and client applications 114, which may include cloud-based applications. The expense-type audit machine learning modeling system 124 may provide for predicting an expense type based on unstructured comments, as explained in further detail below. The expense-type audit machine learning modeling system 124 may comprise one or more servers or other computing devices or systems.

The system 100 further includes one or more third-party server system 130. The one or more third-party server system 130 may include one or more third-party application (s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In another example, a third-party server system 130 is a system associated with an entity that accesses cloud services via server system 102.

The third-party database(s) 134 may be storage devices that store data related to users of the third-party server system 130, applications associated with the third-party server system 130, cloud services, machine learning models, parameters, and so forth. The one or more databases 126 may further store information related to third-party applications 132, client devices 110, client applications 114, users 106, and so forth. In one example, the one or more databases 134 is cloud-based storage.

Figure 2:
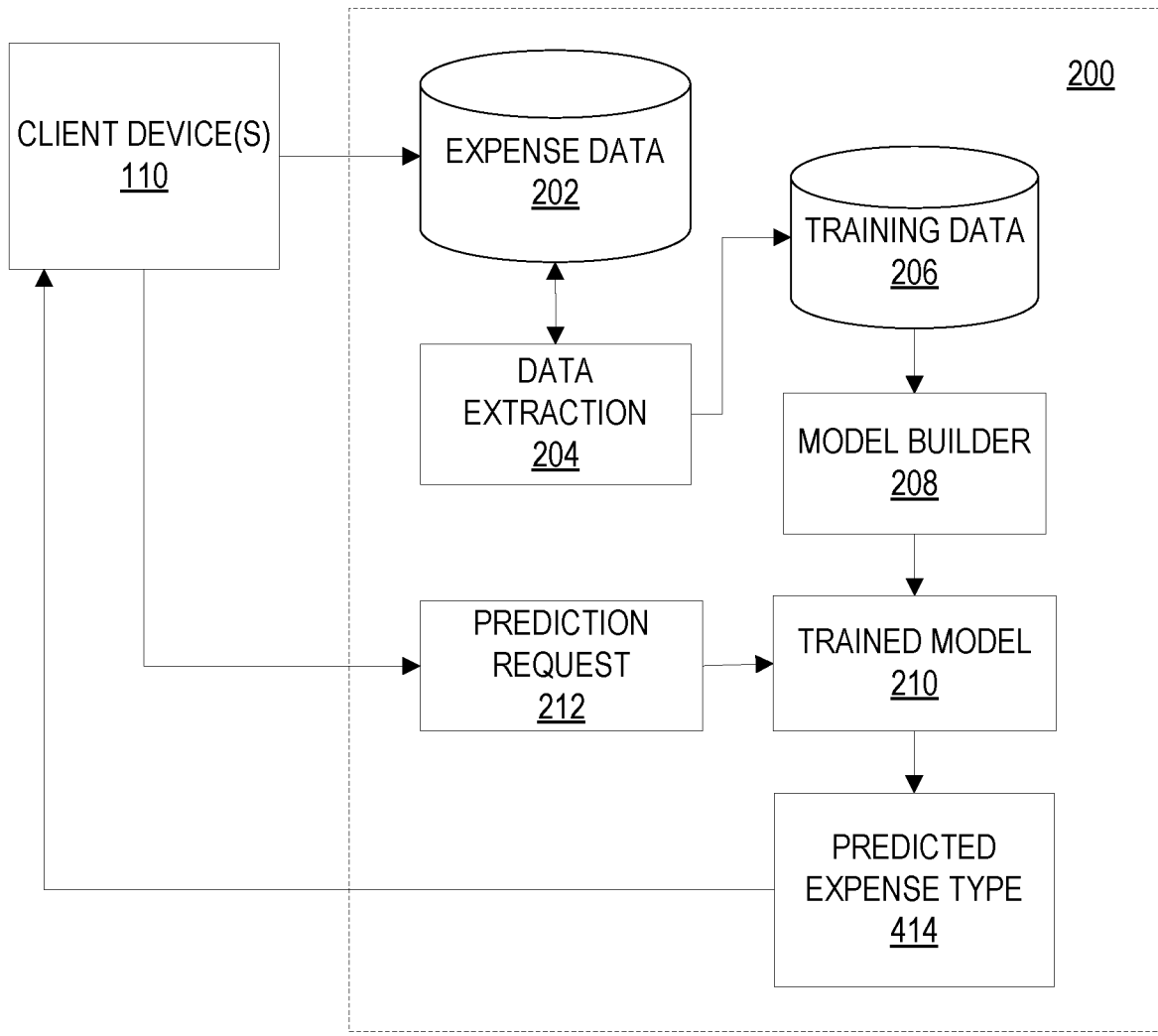
FIG. 2 is a block diagram illustrating a machine learning modeling system, according to some example embodiments.

FIG. 2 is a block diagram illustrating a machine learning modeling system 200 that may be part of the expense-type audit machine learning modeling system 124 or server system 102. Client devices 110 interact with the server system 102, thereby generating data related to the interactions with the system. For example, a client device 110 may be used to enter expense information for a transaction, such as an amount spent on lunch with a client, airfare for a conference, transportation to a business meeting, educational development expenses, office supplies, and so forth. FIG. 3 illustrates an example user interface 300 that allows a user to enter expense information. In the example user interface 300, the user can enter an expense type 302, a comment 304, one or more receipts, among other information and submit the response via a button 306 or other means. These interactions and data associated with the interactions are stored in one or more databases, as shown as expense data 202. In other examples, this data may be stored in multiple databases, or in databases internal to the server system 102, external to the expense-type audit machine learning modeling system 124, or a combination of both. The expense data 202 may thus be received from client devices 110, from other datastores within the server system 102 or expense-type audit machine learning modeling system 124, and/or from third-party sources such as the third-party server system 130.

A data extraction component 204 extracts data from the expense data 202 and stores the data as training data 206. For example, the data extraction component 204 may extract data related to users of the system, data related to expenses entered into the system, data related to entities in the system, and so forth. In one example, the data extraction component 204 accesses the expense data 202 and extracts data from the expense data 202 comprising a plurality of submitted expenses and associated text comments to generate training data 206. The specific data extracted can include expense information that includes a comment. The data extraction component 204 extracts at least an expense type entered and the corresponding comment text for each expense to store as the training data 206. It is to be understood that other or additional data can also be extracted and stored as training data 206. In one example, the data extraction component 204 extracts a predetermined number of expenses or expenses in a predefined time period that include a comment.

In one example a company identifier (e.g., a unique identifier) is also extracted and used as training data. In one example, each company has a custom class. In one example the custom class is in a numeric format, such as 1101, 1026, but it is to be understood that the custom class can be in other formats in example embodiments. In another example, the system stores unique expense type classes, such as by company identifier and custom expense type (e.g., <company_ID>_<custom_expense_type>). For example, a unique expense type class can be p0123456abcd_1101 or p1234567wxyz_1026. In this way the machine learning model supports tens of thousands of classes that thus, one machine learning model may be used for numerous companies.

In one example, the model builder 208 performs some data preprocessing to clean the extracted data to generate training data 206. This can include filtering the data by language or numbers, deduplication, and other standard preprocessing methods.

The model builder 208 uses the training data 206 to train the trained model 210 to generate a prediction of an expense type. In one example, the model builder 208 loads a deep neural network model such as a pre-trained transformer model. Some examples of a pre-trained transformer model include Bidirectional Encoder Representations from Transformer (BERT), Robustly Optimized BERT (RoBERTa), LayoutLM, or the like. The model builder 208 customizes the pre-trained transformer model by adding two customized layers and training it with specialized data (e.g., the training data 206) to generate the trained model 210. In one example, two Keras layers are added to fine-tune a pre-trained transformer model. A first Keras layer is a "drop out" to prevent overfitting and a second Keras layer is a "softmax classifier" that is responsible to generate output.

During an example test, the trained model 210 preformed at a 90% accuracy on the freeform text of the comments. Further, both training and prediction were very fast. Training took 15 minutes to one hour depending on the amount of training data 206 and prediction occurred in real time or near real time upon receiving input (e.g., comment text) to the trained model 210. In one example the response time was about 100 milliseconds. In one example, both one or more central processing units (CPUs) and one or more graphical processing units (GPUs) were utilized to achieve from six to ten times faster training time than just using a CPU. It is to be understood that both a CPU and GPU may be used in example embodiments described herein or just a CPU may be used in example embodiments described herein.

The trained model can be used to predict an expense type. For example, a prediction request 212 can be received from a client device 110, third-party server system 130, or other computing device or system. In one example, the prediction request is simply a user submitting an expense or a bulk file of submitted expenses. In one example the prediction request includes comment text for an expense. The comment text is input into the trained model 210 and a predicted expense type 414 is generated by the trained model 210 and can be returned to the client device 110 or other requesting computing device or system, as explained in further detail below.

The trained machine learning model can be periodically retrained based on new expense information received by the computing system. For example, the computing system updates training data comprising comment text for a plurality of submitted expenses that were submitted within predetermined time frame (e.g., daily, weekly, monthly, yearly) after the machine learning model was last trained. In one example, the computing system retrains the machine learning model based on a trigger that detects how the data was changed since the machine learning model was last trained, such as detecting that the data has changed more than a specified threshold value (e.g., 10 or 20 percent). The computing system trains the machine learning model using the updated training data, to generate an updated trained machine learning model, as described above with respect to training the machine learning model.

Figure 4:
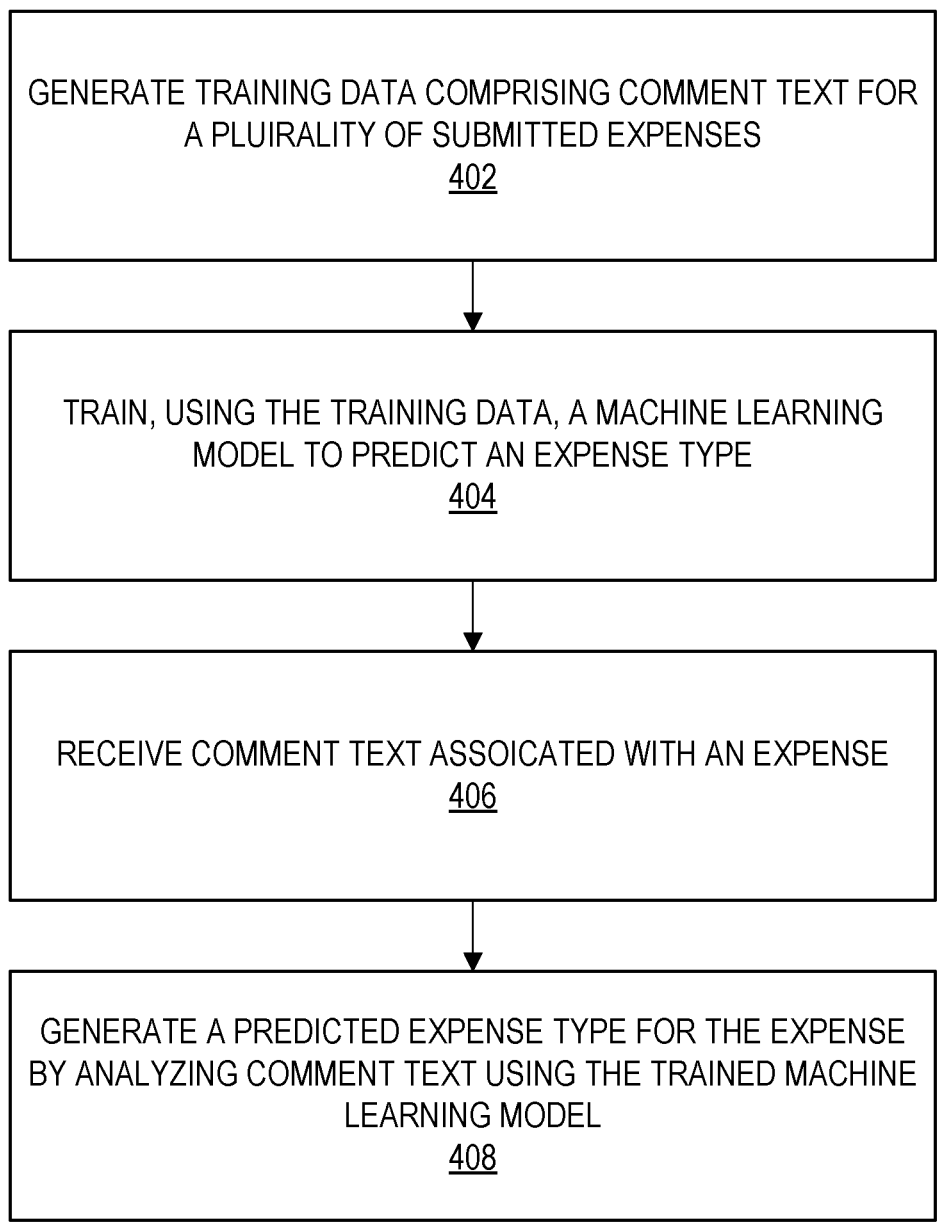
FIG. 4 comprises a flow chart illustrating aspects of a method, according to some example embodiments.

FIG. 4 is a flow chart illustrating aspects of a method 400 for an expense-type audit machine learning modeling system 124, according to some example embodiments. For illustrative purposes, method 400 is described with respect to the block diagram of FIG. 1 and FIG. 2. It is to be understood that method 400 may be practiced with other system configurations in other embodiments.

In operation 402, a computing system (e.g., server system 102 or expense-type audit machine learning modeling system 124), generates or creates, by one or more processors of the computing system, training data comprising comment text for a plurality of submitted items (e.g., expenses). For example, and as explained above with respect to FIG. 2, the data extraction component 204 extracts data from the expense data 202 and stores the data as training data 206. In one example, the data extraction component 204 accesses the expense data 202 and extracts data from the expense data 202 comprising a plurality of submitted expenses and associated text comments to generate training data 206. The specific data extracted can include expense information that includes a comment (e.g., comment text). The data extraction component 204 extracts at least an expense type entered and the corresponding comment text for each expense to store as the training data 206. It is to be understood that other or additional data can also be extracted and stored as training data 206 (e.g., company identifier). In one example, the data extraction component 204 extracts a predetermined number of expenses or expenses in a predefined time period that include a comment.

Returning to FIG. 4, in operation 404, the computing system trains a machine learning model to predict an expense type using the training data, to generate a trained machine learning model, as explained above. In one example the machine learning model is a deep neural network model.

In operation 406, the computing system receives comment text associated with an expense. For example, a user may enter expense information on the user's computing device (e.g., client device 110), as shown in FIG. 3 and described above. The computing device sends the expense information to the computing system and the computing system receives the expense information, comprising the comment text, from the computing device. The expense information may also include an expense type entered by the user, and other expense information, such as a company identifier.

In operation 408, the computing system generates a predicted expense type for the expense by analyzing the comment text using the trained machine learning model. For example, the comment text is input into the trained machine learning model and the trained machine learning model outputs a predicted expense type for the comment text. In one example, the predicted expense type is generated in real time or near real time from receipt of the expense and associated comment.

In one example, before generating the predicted expense type, the computing system determines whether the trained machine learning model is a most updated machine learning model. If the trained machine learning model is not the most updated machine learning model, the computing system loads the most updated machine learning model and uses the most updated machine learning model to generate the predicted expense type.

The predicted expense type can be used in a number of different scenarios. For example, the predicted expense type can be provided to the computing device. The computing device can then compare the predicted expense type to the expense type entered and send a notification or display a message to the user that the expense type entered by the user is incorrect. In another example, the computing system can compare the predicted expense type to the expense type entered and send a notification to the computing device or cause a message to display to the user that the expense type entered by the user is incorrect. FIG. 5 illustrates an example user interface 500 where a user has entered an expense type of "hotel" and a comment stating, "3 months membership in fitness center." A message 502 can be displayed to let the user know that the expense type does not match the comment, allowing the user to enter the correct expense type. In one example, the displayed message can also indicate the correct expense type based on the predicted expense type. For example, if the predicted expense type is "health club membership," the computing system or computing device compares "health club membership" with "hotel" that was entered by the user, determines that they do not match and thus, the expense type entered is incorrect, and display a message on the computing device with the correct expense type to be entered.

In another example, the predicted expense type can be used to automatically update an incorrect expense type. For example, the computing system compares the entered expense type with the predicted expense type. If the entered expense type does not match the predicted expense type, the computing system automatically updates the entered expense type with the predicted expense type.

In one example, the computing system automatically updates the expense type with the predicted expense type if a confidence value of the predicted expense type is over a threshold confidence value. For instance, the trained machine learning model can output a predicted expense type and a value between 0 and 1 for a confidence score indicating the likelihood that the predicted expense type is correct. The threshold confidence value can be set at any value, such as 0.8 or 0.9. Using a 0.8 threshold confidence value as an example, if the confidence score output by the trained machine learning model is equal to or greater than 0.8, then the entered expense type is automatically updated to the predicted expense type. If the confidence score output by the trained machine learning model is less than 0.8, the entered expense type is not automatically updated to the predicted expense type, and instead may just be flagged or a notification may be sent to a computing device indicating the potential expense type error.

As indicated above, comment text for each expense can be received as each expense is submitted. In another example, the comment text is one of many associated with a plurality of expenses that is sent in a bulk format. For example, a single or multiple files can be sent with the plurality of expenses and corresponding comment text to the computing system. The computing system generates a predicted expense type for each of the plurality of expenses by analyzing each respective comment text using the trained machine learning model. In one example, a mismatch between an entered expense type and a predicted expense type can be flagged or automatically corrected to change the expense time to the predicted expense type. In one example, the expense type is only corrected if a confidence score corresponding to the predicted expense type is over a threshold confidence value, as explained above.

In view of the above disclosure, various examples are set forth below. It should be noted that one or more features of an example, taken in isolation or combination, should be considered within the disclosure of this application.

Example 1. A computer-implemented method comprising:
    generating, by one or more processors of a computing system, training data comprising comment text for a plurality of submitted expenses;
    training, by the one or more processors of the computing system, a machine learning model to predict an expense type using the training data, to generate a trained machine learning model;
    receiving, by the one or more processors of the computing system, comment text associated with an expense; and
    generating, by the one or more processors of the computing system, a predicted expense type for the expense by analyzing the comment text using the trained machine learning model.

Example 2. A computer-implemented method according to any of the previous examples, further comprising:
    providing the generated predicting expense type to a computing device.

Example 3. A computer-implemented method according to any of the previous examples, further comprising:
    comparing the predicted expense type to an expense type entered for the expense to determine whether the predicted expense type matches the expense type entered for the expense; and
    based on determining that the predicted expense type does not match the expense type entered for the expense, sending a notification to a computing device indicating a correct expense type based on the predicted expense type.

Example 4. A computer-implemented method according to any of the previous examples, further comprising:
    generating updated training data comprising comment text for a plurality of submitted expenses that were submitted within a predetermined time frame after the machine learning model was last trained; and
    training the machine learning model to predict an expense type using the updated training data, to generate an updated trained machine learning model.

Example 5. A computer-implemented method according to any of the previous examples, wherein before generating the predicted expense type, the method comprises:
    determining whether the trained machine learning model is a most updated machine learning model; and
    based on determining that the trained machine learning mode is not the most updated machine learning model, loading the most updated machine learning model and using the most updated machine learning model to generate the predicted expense type.

Example 6. A computer-implemented method according to any of the previous examples, wherein the machine learning model is a deep neural network model.

Example 7. A computer-implemented method according to any of the previous examples, further comprising:
determining that the predicted expense type has a confidence value over a threshold confidence value; and
causing an expense type entered for the expense to be automatically updated with the predicted expense type.

Example 8. A computer-implemented method according to any of the previous examples, wherein the received expense is one of a plurality of expenses received in a bulk format, and wherein the computing system generates a predicted expense type for each of the plurality of expenses by analyzing each respective comment text using the trained machine learning model.

Example 9. A computer-implemented method according to any of the previous examples, wherein the predicted expense type is generated in real time from receipt of the expense and associated comment.

Example 10. A system in a cloud computing environment comprising:
a memory that stores instructions; and
one or more processors configured by the instructions to perform operations comprising:
generating training data comprising comment text for a plurality of submitted expenses;
training a machine learning model to predict an expense type using the training data, to generate a trained machine learning model;
receiving comment text associated with an expense; and
generating a predicted expense type for the expense by analyzing the comment text using the trained machine learning model.

Example 11. A system according to any of the previous examples, the operations further comprising:
providing the generated predicting expense type to a computing device.

Example 12. A system according to any of the previous examples, the operations further comprising:
comparing the predicted expense type to an expense type entered for the expense to determine whether the predicted expense type matches the expense type entered for the expense; and
based on determining that the predicted expense type does not match the expense type entered for the expense, sending a notification to a computing device indicating a correct expense type based on the predicted expense type.

Example 13. A system according to any of the previous examples, the operations further comprising:
generating updated training data comprising comment text for a plurality of submitted expenses that were submitted within a predetermined time frame after the machine learning model was last trained; and
training the machine learning model to predict an expense type using the updated training data, to generate an updated trained machine learning model.

Example 14. A system according to any of the previous examples, wherein before generating the predicted expense type, the operations comprise:
determining whether the trained machine learning model is a most updated machine learning model; and
based on determining that the trained machine learning mode is not the most updated machine learning model, loading the most updated machine learning model and using the most updated machine learning model to generate the predicted expense type.

Example 15. A system according to any of the previous examples, wherein the machine learning model is a deep neural network model.

Example 16. The system of claim 10, the operations further comprising:
determining that the predicted expense type has a confidence value over a threshold confidence value; and
causing an expense type entered for the expense to be automatically updated with the predicted expense type.

Example 17. A system according to any of the previous examples, wherein the received expense is one of a plurality of expenses received in a bulk format, and wherein the computing system generates a predicted expense type for each of the plurality of expenses by analyzing each respective comment text using the trained machine learning model.

Example 18. A system according to any of the previous examples, wherein the predicted expense type is generated in real time from receipt of the expense and associated comment.

Example 19. A non-transitory computer-readable medium comprising instructions stored thereon that are executable by at least one processor to cause a computing device to perform operations comprising:
generating training data comprising comment text for a plurality of submitted expenses;
training a machine learning model to predict an expense type using the training data, to generate a trained machine learning model;
receiving comment text associated with an expense; and
generating a predicted expense type for the expense by analyzing the comment text using the trained machine learning model.

Example 20. A non-transitory computer-readable medium according to any of the previous examples, wherein the predicted expense type is generated in real time from receipt of the expense and associated comment.

Figure 6:
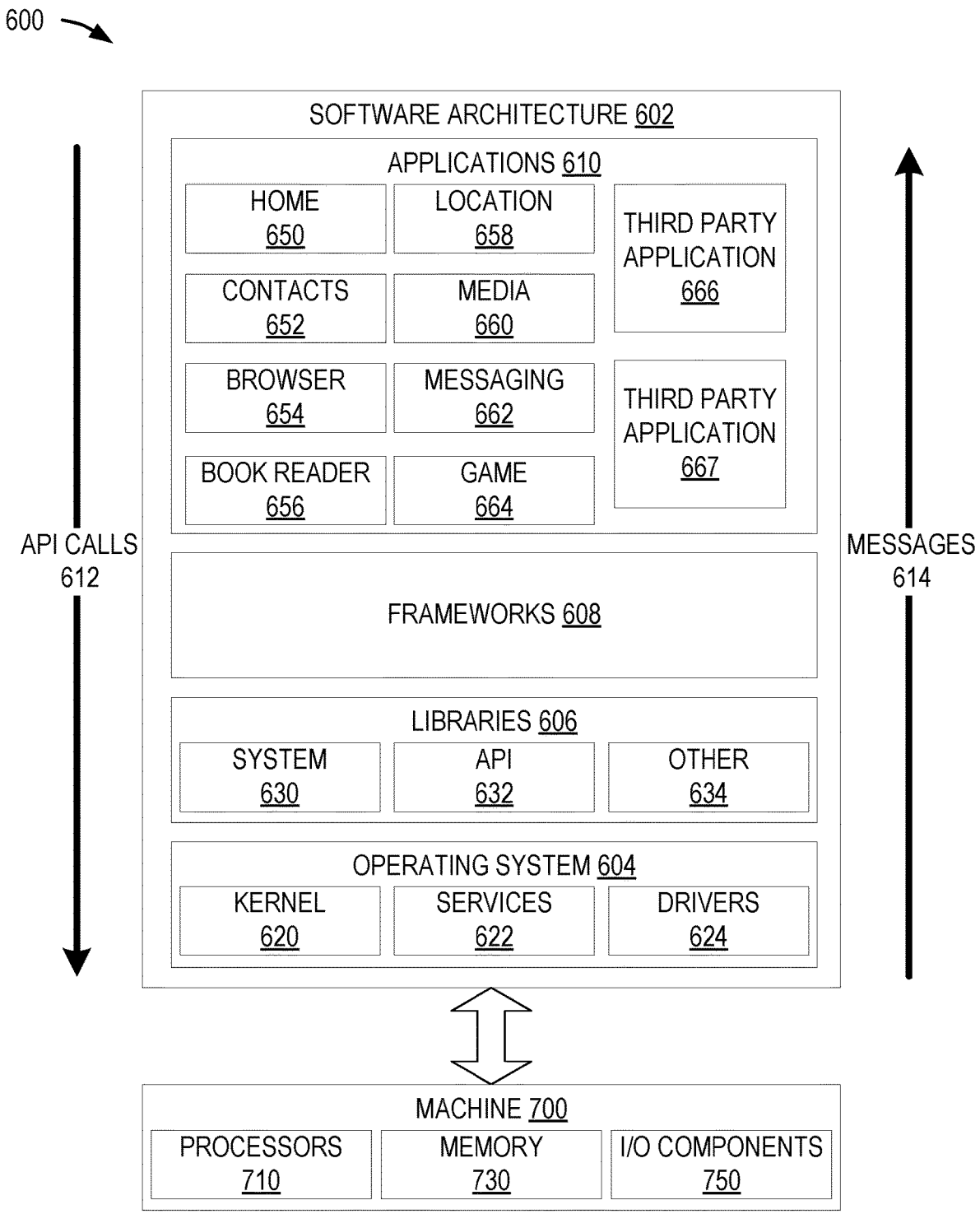
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
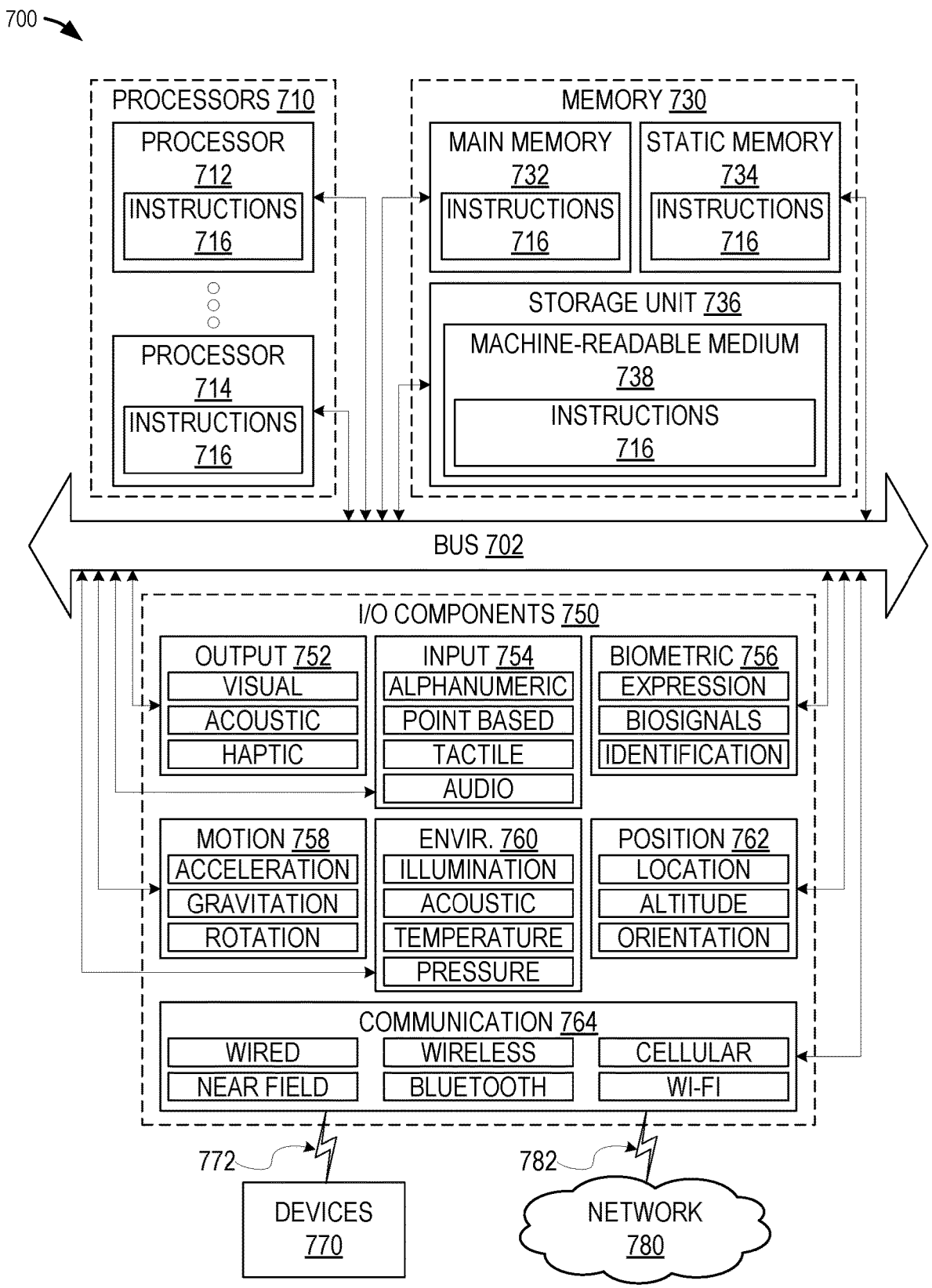
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   extracting for each of a plurality of submitted expenses an expense type and corresponding comment text entered by a respective user of a plurality of users to generate training data comprising the extracted expense type and corresponding comment text for each of the plurality of submitted expenses;
   generating a customized machine learning model by:
      adding, to a pretrained machine learning model, a first customized layer to prevent overfitting and a second customized layer comprising a classifier to generate output; and
      training the pretrained machine learning model with the added first customized layer and second customized layer using the training data comprising the extracted expense type and corresponding comment text entered by a respective user of a plurality of users for each of the plurality of submitted expenses to generate a trained machine learning model configured to predict, in real time, an expense type for a given expense entry by a respective user;
   detecting user entry in a user interface on a respective computing device of comment text associated with an expense for each of a plurality of entered expenses from a plurality of computing devices; and automatically updating, in real time from detecting user entry of comment text associated with an expense for each of the plurality of entered expenses from the plurality of computing devices, incorrect expense types by performing operations comprising:

generating, in real time, a predicted expense type for each entered expense and a confidence value indicating a likelihood that the predicted expense type is correct, by analyzing, by the trained machine learning model, the comment text of each user entry of the plurality of entered expenses from the plurality of computing devices;

comparing the predicted expense type to a corresponding expense type entered for the expense for each of the plurality of entered expenses to determine whether the predicted expense type matches the expense type entered for the expense;

determining that a subset of the plurality of entered expenses have expense types entered that do not match a corresponding predicted expense type and have a predicted expense type with a confidence value over a threshold confidence value;

causing each expense type of the subset of the plurality of entered expenses to be automatically updated with the predicted expense type; and causing display, on each user interface on the respective computing device associated with each of the plurality of entered expenses, of a notification indicating that the expense type entered via user entry was incorrect.

2. The computer-implemented method of claim 1, further comprising:

extracting updated expense data comprising a plurality of submitted expenses that were submitted within a predetermined time frame after the trained machine learning model was last trained; and re-training the trained machine learning model using the updated expense data, to generate an updated trained machine learning model.

3. The computer-implemented method of claim 1, wherein before generating the predicted expense type, the method comprises:

determining whether the trained machine learning model is a most updated machine learning model; and based on determining that the trained machine learning model is not the most updated machine learning model, loading the most updated machine learning model and using the most updated machine learning model to generate the predicted expense type.

4. The computer-implemented method of claim 1, wherein the trained machine learning model is a deep neural network model.

5. The computer-implemented method of claim 1, wherein the first customized layer and the second customized layer are each Keras layers.

6. The computer-implemented method of claim 1, wherein a company identifier is further extracted from the plurality of submitted expenses and the pretrained machine learning model is further trained on extracted company identifiers to generate the trained machine learning model.

7. The computer-implemented method of claim 6, wherein each expense type is a custom expense type associated with a respective company identifier or a standard expense type used across different entities.

8. The computer-implemented method of claim 7, wherein each custom expense type is stored as a unique expense type class comprising the company identifier and custom expense type.

9. The computer-implemented method of claim 1, wherein the plurality of submitted expenses are those within a predefined time period.

10. The computer-implemented method of claim 5, wherein the first customized layer is a drop out.

11. The computer-implemented method of claim 5, wherein the second customized layer is a softmax classifier.

12. The computer-implemented method of claim 1, wherein the pretrained machine learning model is trained using one or more central processing units and one or more graphical processing units.

13. A system in a cloud computing environment comprising:

a memory that stores instructions; and one or more processors configured by the instructions to perform operations comprising:

extracting for each of a plurality of submitted expenses comprising an expense type and corresponding comment text entered by a respective user of a plurality of users to generate training data comprising the extracted expense type and corresponding comment text for each of the plurality of submitted expenses;

generating a customized machine learning model by:

adding, to a pretrained machine learning model, a first customized layer to prevent overfitting and a second customized layer comprising a classifier to generate output; and training the pretrained machine learning model with the added first customized layer and second customized layer using the training data comprising the extracted expense type and corresponding comment text entered by a respective user of a plurality of users for each of the plurality of submitted expenses to generate a trained machine learning model configured to predict, in real time, an expense type for a given expense entry by a respective user;

detecting user entry in a user interface on a respective computing device of comment text associated with an expense for each of a plurality of entered expenses from a plurality of computing devices; and automatically updating, in real time from detecting user entry of comment text associated with an expense for each of the plurality of entered expenses from the plurality of computing devices, incorrect expense types by performing operations comprising:

generating, in real time, a predicted expense type for each entered expense and a confidence value indicating a likelihood that the predicted expense type is correct, by analyzing, by the trained machine learning model, the comment text of each user entry of the plurality of entered expenses from the plurality of computing devices;

comparing the predicted expense type to a corresponding expense type entered for the expense for each of the plurality of entered expenses to determine whether the predicted expense type matches the expense type entered for the expense;

determining that a subset of the plurality of entered expenses have expense types entered that do not match a corresponding predicted expense type and have a predicted expense type with a confidence value over a threshold confidence value;

causing each expense type of the subset of the plurality of entered expenses to be automatically updated with the predicted expense type; and causing display, on the respective computing device associated with each of the plurality of entered expenses, of a notification indicating that the expense type entered via user entry was incorrect.

14. The system of claim 13, the operations further comprising:

extracting updated expense data comprising a plurality of submitted expenses that were submitted within a predetermined time frame after the trained machine learning model was last trained; and re-training the trained machine learning model using the updated expense data, to generate an updated trained machine learning model.

15. The system of claim 13, wherein before generating the predicted expense type, the operations comprise:

determining whether the trained machine learning model is a most updated machine learning model; and based on determining that the trained machine learning model is not the most updated machine learning model, loading the most updated machine learning model and using the most updated machine learning model to generate the predicted expense type.

16. The system of claim 13, wherein the trained machine learning model is a deep neural network model.

17. A non-transitory computer-readable medium comprising instructions stored thereon that are executable by at least one processor to cause a computing device to perform operations comprising:

extracting for each of a plurality of submitted expenses an expense type and corresponding comment text entered by a respective user of a plurality of users to generate training data comprising the extracted expense type and corresponding comment text for each of the plurality of submitted expenses;

generating a customized machine learning model by:

adding, to a pretrained machine learning model, a first customized layer to prevent overfitting and a second customized layer comprising a classifier to generate output; and training the pretrained machine learning model with the added first customized layer and second customized layer using the training data comprising the extracted expense type and corresponding comment text entered by a respective user of a plurality of users for each of the plurality of submitted expenses to generate a trained machine learning model configured to predict, in real time, an expense type for a given expense entry by a respective user;

detecting user entry in a user interface on a respective computing device of comment text associated with an expense for each of a plurality of entered expenses from a plurality of computing devices; and automatically updating, in real time from detecting user entry of comment text associated with an expense for each of the plurality of entered expenses from the plurality of computing devices, incorrect expense types by performing operations comprising:

generating, in real time, a predicted expense type for each entered expense and a confidence value indicating a likelihood that the predicted expense type is correct, by analyzing, by the trained machine learning model, the comment text of each user entry of the plurality of entered expenses from the plurality of computing devices;

comparing the predicted expense type to a corresponding expense type entered for the expense for each of the plurality of entered expenses to determine whether the predicted expense type matches the expense type entered for the expense;

determining that a subset of the plurality of entered expenses have expense types entered that do not match a corresponding predicted expense type and have a predicted expense type with a confidence value over a threshold confidence value;

causing each expense type of the subset of the plurality of entered expenses to be automatically updated with the predicted expense type; and causing display, on each user interface on the respective computing device associated with each of the plurality of entered expenses, of a notification indicating that the expense type entered via user entry was incorrect.

18. The non-transitory computer-readable medium of claim 17, the operations further comprising:

extracting updated expense data comprising a plurality of submitted expenses that were submitted within a predetermined time frame after the trained machine learning model was last trained; and re-training the trained machine learning model using the updated expense data, to generate an updated trained machine learning model.

19. The non-transitory computer-readable medium of claim 17, wherein before generating the predicted expense type, the operations comprise:

determining whether the trained machine learning model is a most updated machine learning model; and based on determining that the trained machine learning model is not the most updated machine learning model, loading the most updated machine learning model and using the most updated machine learning model to generate the predicted expense type.

* * * * *